(12) United States Patent
Weinberger

(10) Patent No.: US 11,529,017 B2
(45) Date of Patent: Dec. 20, 2022

(54) CLEANING DEVICES AND SYSTEMS

(71) Applicant: MIW Associates LLC, Havertown, PA (US)

(72) Inventor: Marvin Weinberger, Havertown, PA (US)

(73) Assignee: MIW Associates LLC, Havertown, PA (US)

( * ) Notice: Subject to any disclaimer, the term of this patent is extended or adjusted under 35 U.S.C. 154(b) by 122 days.

(21) Appl. No.: 16/354,798

(22) Filed: Mar. 15, 2019

(65) Prior Publication Data

US 2019/0282033 A1 Sep. 19, 2019

Related U.S. Application Data

(60) Provisional application No. 62/651,941, filed on Apr. 3, 2018, provisional application No. 62/643,945, filed on Mar. 16, 2018.

(51) Int. Cl.
*A47J 37/07* (2006.01)
*B08B 1/00* (2006.01)

(52) U.S. Cl.
CPC .......... *A47J 37/0786* (2013.01); *B08B 1/005* (2013.01)

(58) Field of Classification Search
CPC ....... A47J 37/0786; A47J 33/00; B08B 1/005; A47L 17/00
USPC ................... 15/236.01, 236.07, 168; 99/450; 126/173, 214 C; D7/688; 30/172
See application file for complete search history.

(56) References Cited

U.S. PATENT DOCUMENTS

| | | | | |
|---|---|---|---|---|
| 2010/0154824 A1* | 6/2010 | Vosbikian | ............ | A46B 5/0008 134/6 |
| 2014/0331424 A1* | 11/2014 | Gonzalez | ............ | A47J 37/0786 15/207.2 |
| 2017/0055689 A1* | 3/2017 | Gunjian | ............ | A46D 3/00 |

OTHER PUBLICATIONS

BBQ Guys, "18-inch Stainless Steel Grill Scraper", Retrieved from the Internet on Feb. 20, 2019, at URL: <<https://www.bbqguys.com/charcoal-companion/18-inch-stainless-steel-grill-scraper>>, 6 pages.
GrillFloss, "GrillFloss—Ultimate Grill Cleaning Tool", Retrieved from the Internet on Mar. 15, 2019, at URL: <<http://www.grillfloss.com/shop/grillfloss-ultimate-grill-cleaning-tool/>>, 1 page.

* cited by examiner

*Primary Examiner* — Katina N. Henson
(74) *Attorney, Agent, or Firm* — Duane Morris LLP

(57) ABSTRACT

A cleaning device having a handle and one or more cleaning members. A first of the cleaning members has a first finger, a second finger spaced apart from the first finger, and a compliant member extending from the first finger to the second finger. The compliant member is constructed at least partially from a metallic material. The first finger is spaced from the second finger to accommodate a cross-member of a cooking grate between the first finger and the second finger such that the compliant member contacts the cross-member. A second of the cleaning members has an elongation and a first bar and a second bar extending transverse to the elongation, the second bar spaced from the first bar along the elongation. The second of the cleaning members is configured to be inserted between adjacent cross-members of a cooking grate and, after insertion, rotated.

14 Claims, 17 Drawing Sheets

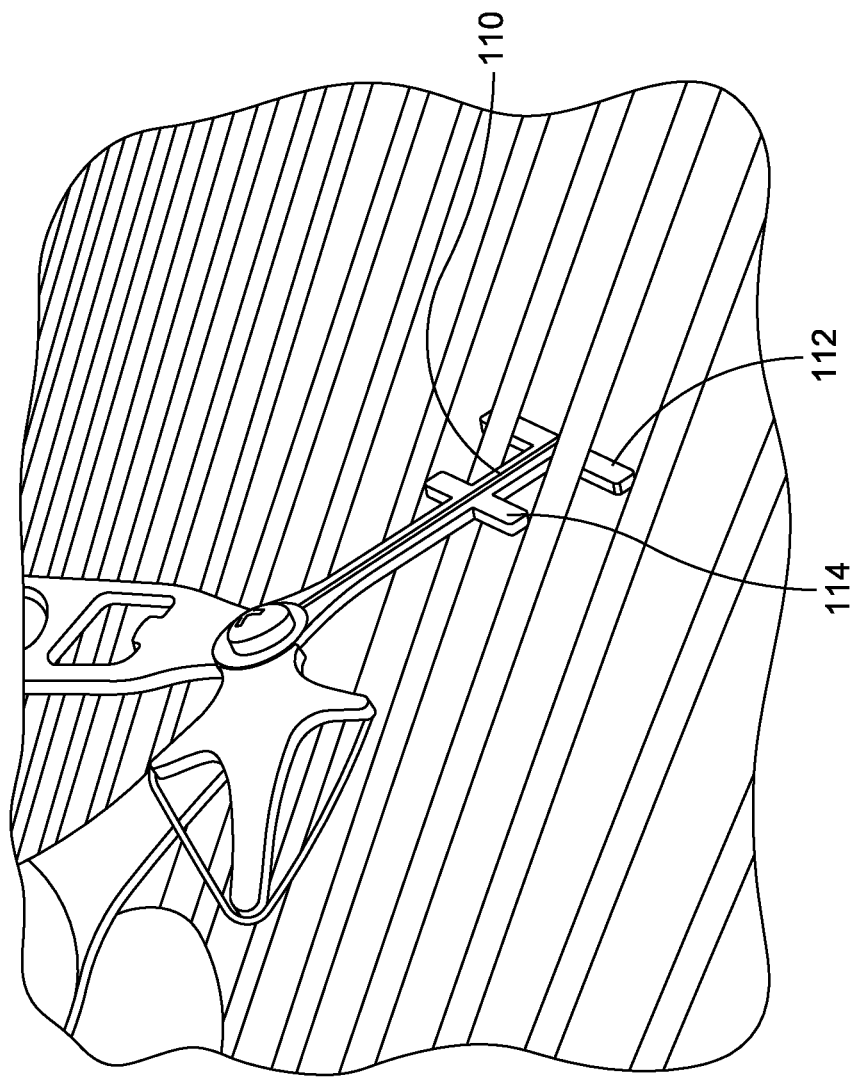
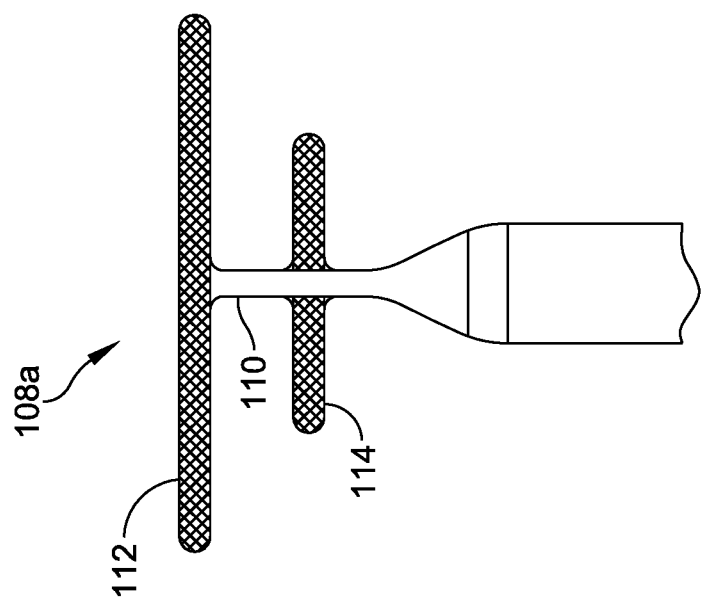
FIG. 2B
FIG. 2A

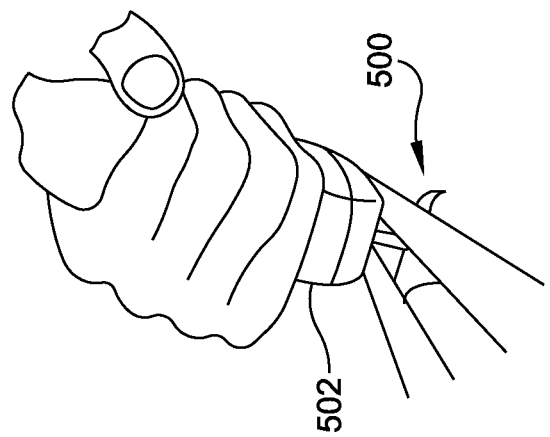

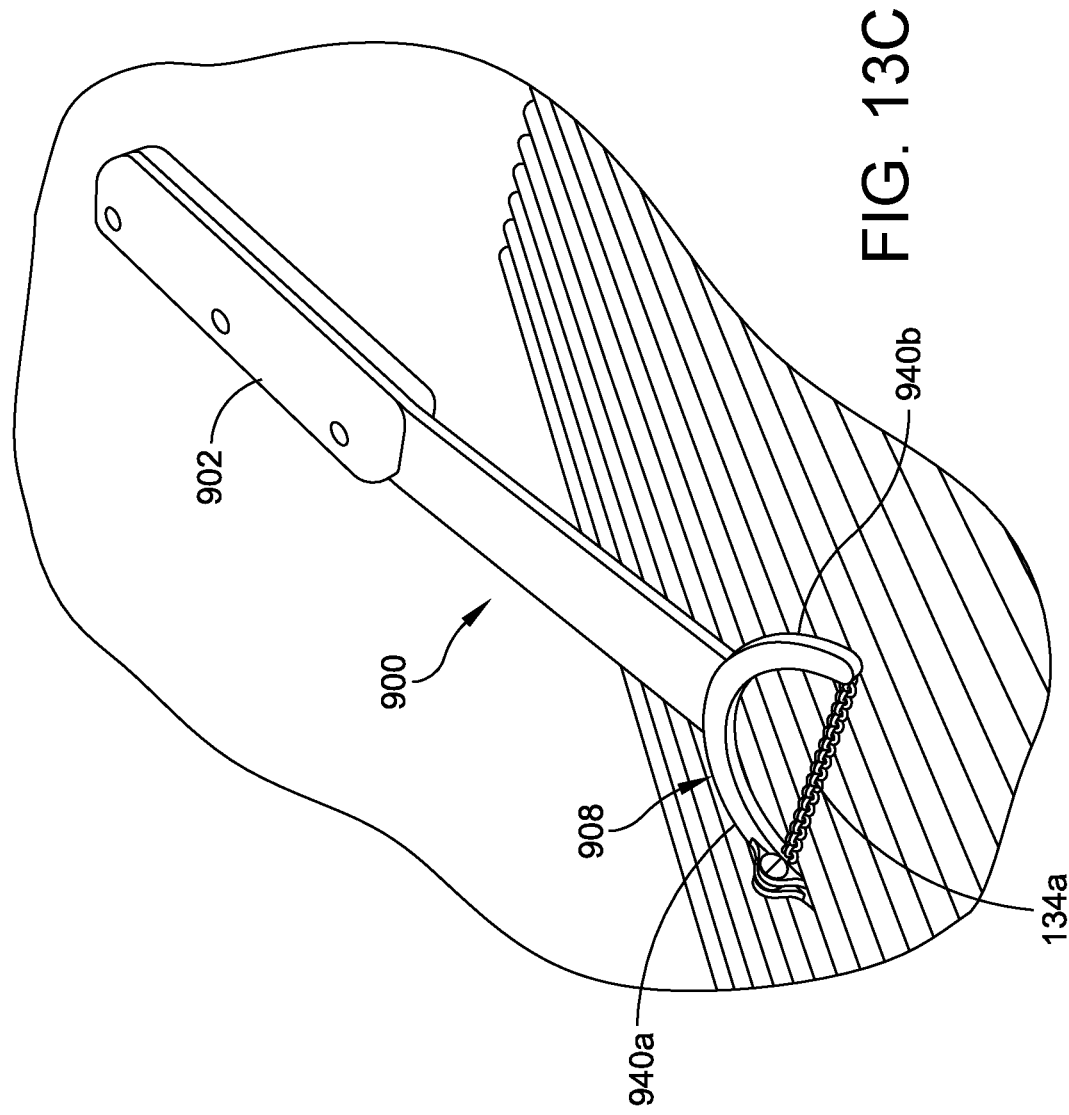

CLEANING DEVICES AND SYSTEMS

CROSS-REFERENCE TO RELATED APPLICATIONS

This application claims priority to U.S. Provisional Application No. 62/651,941, filed Apr. 3, 2018, and U.S. Provisional Application No. 62/643,945, filed Mar. 16, 2018, the entireties of which are incorporated herein by reference.

BACKGROUND

Brushes and scraping devices are often used to clean various items, such as grates on cooking grills. These devices are used to remove portions of food, grease, and other material from the grates to provide a cleaner surface for subsequent cooking. These devices primarily contact, and clean, the top surface of the grate. Many of these devices use cleaning bristles that may become dislodged from the cleaning device and left on the cooking surface where they may contact food cooked thereon.

SUMMARY

In one aspect, a cleaning device includes a handle and a cleaning member coupled to the handle. The cleaning member includes a first finger, a second finger spaced apart from the first finger, and a compliant member extending from the first finger to the second finger. The compliant member is constructed at least partially from a metallic material. The first finger is spaced from the second finger to accommodate a cross-member of a grate between the first finger and the second finger such that the compliant member contacts the cross-member.

In another aspect, a cleaning device includes a handle and a cleaning member. The cleaning member includes a first side finger, a second side finger, and a central finger between the first side finger and the second side finger. The cleaning member further includes a compliant member attached to the first side finger, the central finger, and the second side finger. The first side finger is spaced from the central finger to accommodate a first cross-member of a grate between the first side finger and the central finger. The second side finger is spaced from the central finger to accommodate a second cross-member of the grate between the second side finger and the central finger.

In another aspect, a cleaning device includes a handle, a connector coupled to the handle, a first finger extending from the handle, a second finger extending from the handle, and a compliant member having a first end and a second end each affixed to the connector. The compliant member is slidably engaged with the first finger and the second finger such that the compliant member is configured to conform to a cross-member of a cooking grate disposed between the first finger and the second finger.

BRIEF DESCRIPTION OF THE DRAWINGS

The features and advantages of the embodiments described herein will be more fully disclosed in, or rendered obvious by the following detailed description of the preferred embodiments, which are to be considered together with the accompanying drawings wherein like numbers refer to like parts and further wherein:

FIG. 2A shows a front view of a cleaning member, according to one embodiment.

FIG. 2B shows a perspective view of the cleaning member of FIG. 2A in use.

FIG. 8 shows a perspective view of a cleaning device, according to another embodiment.

FIG. 11 shows the cleaning device of FIG. 9 in use.

FIG. 13C shows a perspective view of the cleaning device of FIG. 13A engaged with a cooking grate.

DETAILED DESCRIPTION

Figure 1:
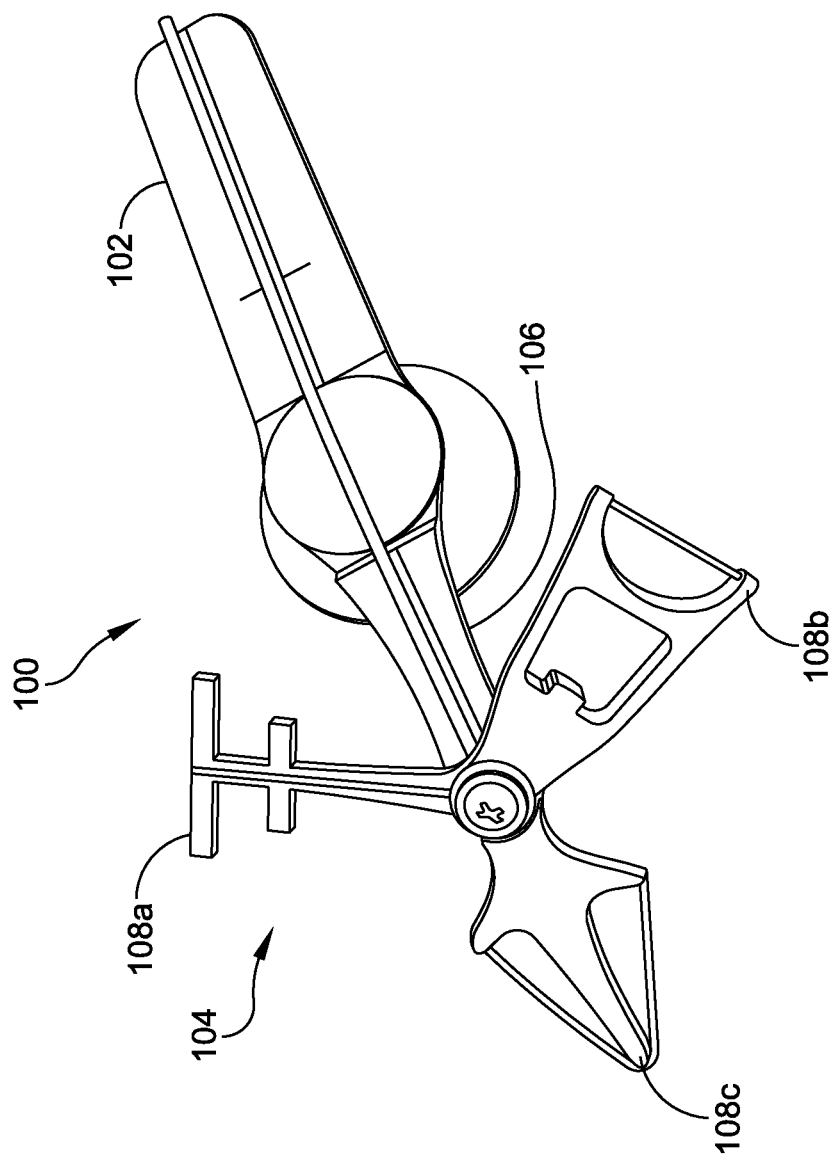
FIG. 1 shows a perspective view of a grill cleaning device, according to one embodiment.

The description of the preferred embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive, as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included."

The present disclosure provides cleaning devices and systems for cleaning various items, such as cooking grates and grids including, for example, those commonly used on cooking grills. In addition to cleaning the top surface of the grate, the cleaning devices described herein allow the user to clean the sides and/or bottom surface of the grates. By so doing, the cleaning devices provided herein increase the cleanliness of the grate and provide a more hygienic surface for subsequent cooking of food.

Although described herein with reference to cleaning a cooking grate, the devices disclosed herein can be used to clean a variety of items, for example radiators.

A cleaning device 100 is shown in FIG. 1. The cleaning device 100 includes a handle 102 and a cleaning end 104. The handle 102 can be ergonomically shaped to provide easy handling by the user. In at least one embodiment, the cleaning device 100 also includes a shaft 106 extending between the handle 102 and the cleaning end 104. The shaft 106 can have any appropriate cross-section including round, square, rectangular, or an irregular cross-section.

The cleaning end 104 includes one or more cleaning members 108. In one example, the cleaning device includes a single cleaning member, according to any of the embodiments described herein.

In another embodiment shown in FIG. 1, the cleaning end 104 includes a first cleaning member 108a, a second cleaning member 108b, and a third cleaning member 108c. The cleaning members 108 can be rotatably attached to the shaft 106. The cleaning members 108 can be separate components joined together at the shaft 106. Alternatively, the cleaning members 108 can be integrally formed. In at least one embodiment, the cleaning members 108 can be locked in desired positions to restrain rotation of the cleaning members 108 with respect to the shaft 106. For example, the cleaning members 108 can include a recess or hole configured to receive a detent formed in, or attached to, the shaft 106. This allows the cleaning members 108 to be locked in an operational position for cleaning the grate.

In another embodiment, the cleaning members 108 are fixed in position relative to the shaft 106 and the handle 102. In such an embodiment, the user can simply rotate the handle in their hand to position the desired cleaning member 108 in an operable cleaning position.

In another embodiment, the cleaning end 104 includes a single cleaning member 108. The single cleaning member 108 can be in the form of any of the first cleaning member 108a, the second cleaning member 108b, the third cleaning member 108c, any other cleaning member described herein, or any other appropriate cleaning member.

Turning to FIG. 2A, the first cleaning member 108a includes an elongation 110, a first bar 112, and a second bar 114. The first bar 112 and the second bar 114 extend transverse to the elongation 110. The first bar 112 and the second bar 114 are spaced from one another along the elongation 110. In one embodiment, the first bar 112 is symmetric about a middle plane of the elongation 110 (i.e., the first bar 112 extends equally from each side of the elongation 110). In another embodiment, the first bar 112 is not symmetric about the middle plane of the elongation. For example, the first bar 112 can extend from only one side of the elongation 110. In one embodiment, the second bar 114 is symmetric about a middle plane of the elongation 110 (i.e., the second bar 114 extends equally from each side of the elongation 110). In another embodiment, the second bar 114 is not symmetric about the middle plane of the elongation. For example, the second bar 114 can extend from only one side of the elongation 110. In one embodiment, the first bar 112 includes a textured surface to enhance the cleaning of the bottom surface of the grate. In one embodiment, the second bar 114 also includes a textured surface.

As shown in FIG. 2B, the first bar 112 and the second bar 114 are spaced along the elongation such that a cross-member of the grate can fit between the first bar 112 and the second bar 114. During use, the first bar 112 is inserted between cross-members of the grate and then the cleaning member is rotated such that the first bar 112 is oriented transverse to the cross-members. In at least one embodiment, the cleaning device 100 is rotated about longitudinal axis 'A' of the handle. The cleaning device 100 is then angled such that the first bar 112 comes into contact with the bottom of the cross-members and the second bar 114 contacts the top of the cross-members. This allows the user to apply pressure to both the top and bottom surfaces of the cross-member to remove debris from the grate. In addition, applying downward force on the top surface of the cross-member with the second bar 114 prevents the grate from liftting off of the grill. In one embodiment, the ends of the first bar 112 and/or second bar 114 are curved or turned to also clean at least a portion of the sides of the cross-members.

Figure 12:
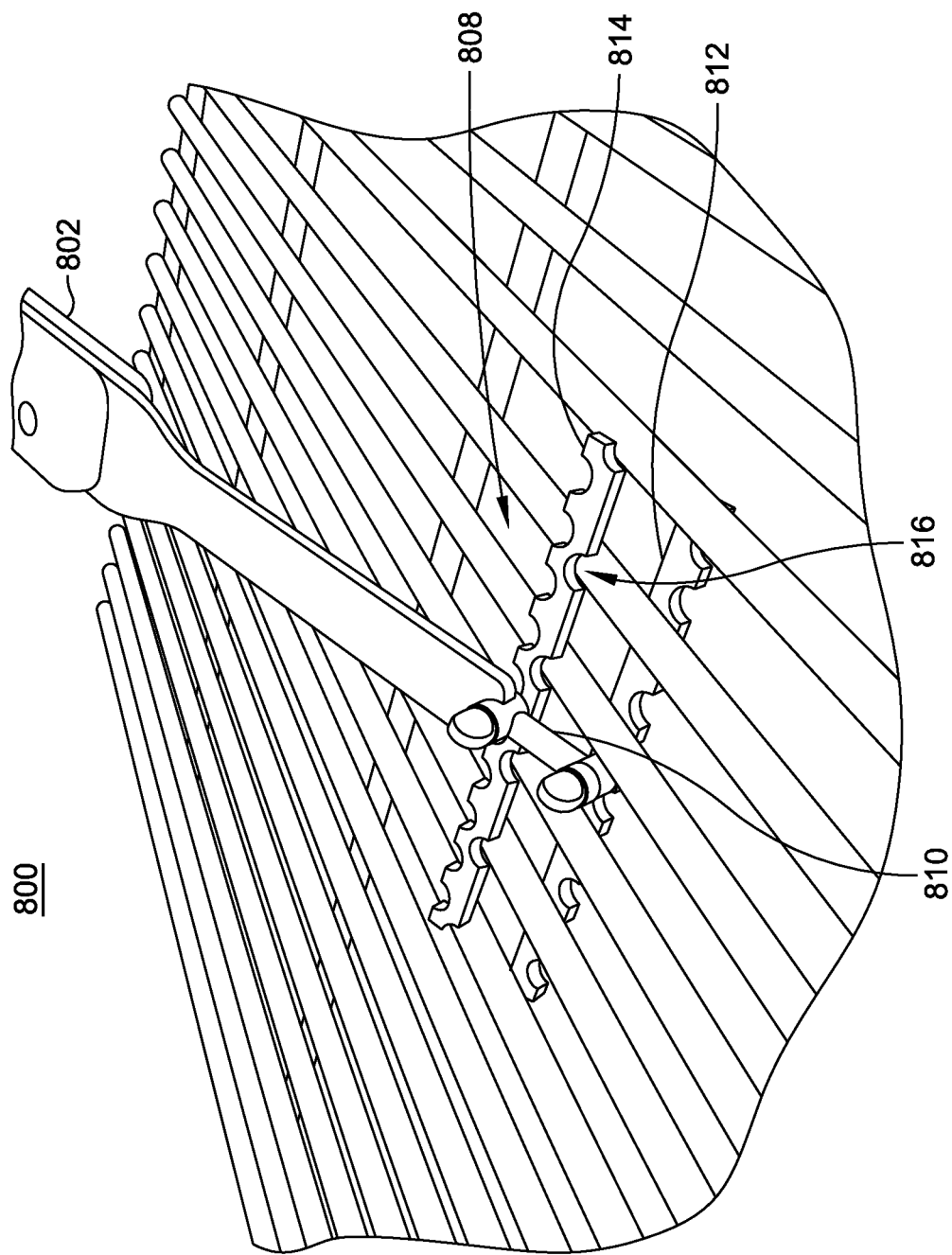
FIG. 12 shows a perspective view of a cleaning device according to another embodiment in use.

Further, as shown in FIG. 12, in one embodiment, a cleaning device 800 includes a handle 802 and a cleaning member 808 extending from the handle 802. The cleaning member includes an elongation 810, a first bar 812, and a second bar 814. The cleaning member 808 can be used to clean a cooking grate in a similar fashion to that described above with respect to cleaning member 108a In addition, first bar 812 and second bar 814 each have a series of recesses 816 configured to receive a cross-member of the cooking grate. As such, the first bar 812 and second bar 814 may contact a greater portion of the cross-members and remove more material therefrom. In one embodiment, each respective bar contacts at least 25% of the circumference of the cross-member. In another embodiment, each respective bar contacts at least 33% of the cross-member. Recesses such as those shown in FIG. 12 can also be included on first bar 112 and second bar 114 of cleaning member 108a as well as the cleaning members shown in FIGS. 8-11.

Figure 8:
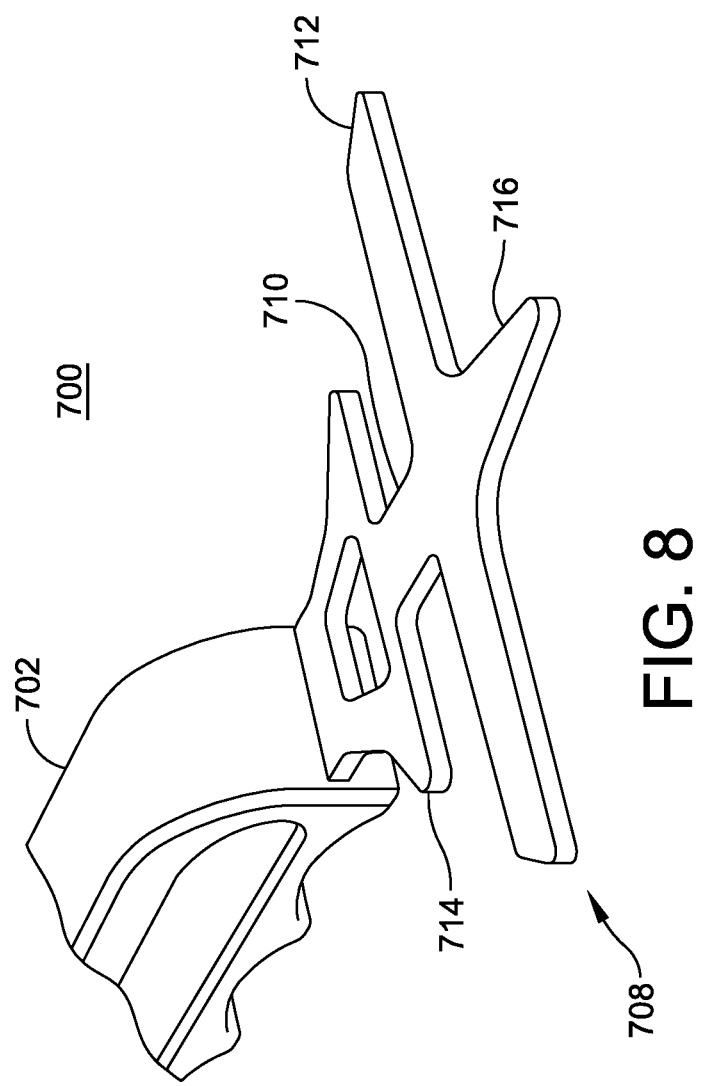
FIG. 8 shows a perspective view of a cleaning member, according to another embodiment.

Turning to FIG. 8, in another embodiment, a cleaning device 700 includes a handle 702 and a cleaning member 708 coupled to and extending from the handle 702. The cleaning member 708 includes an elongation 710, a first bar 712, a second bar 714, and a tooth 716 extending from the first bar 712. The first bar 712 and second bar 714 can be used to clean a cooking surface in a similar fashion to that described above with respect to cleaning member 108b. In addition, cleaning device 700 can also be used to clean the cooking grate by inserting the tooth 716 between adjacent cross-members of the cooking grate such that the first bar 712 is in contact with the top of the cross-members and the tooth 716 contacts the sides of the cross-members. The tooth 716 can include geometry configured to maximize the contact between the cross-members and the cleaning member 708.

Figure 4:
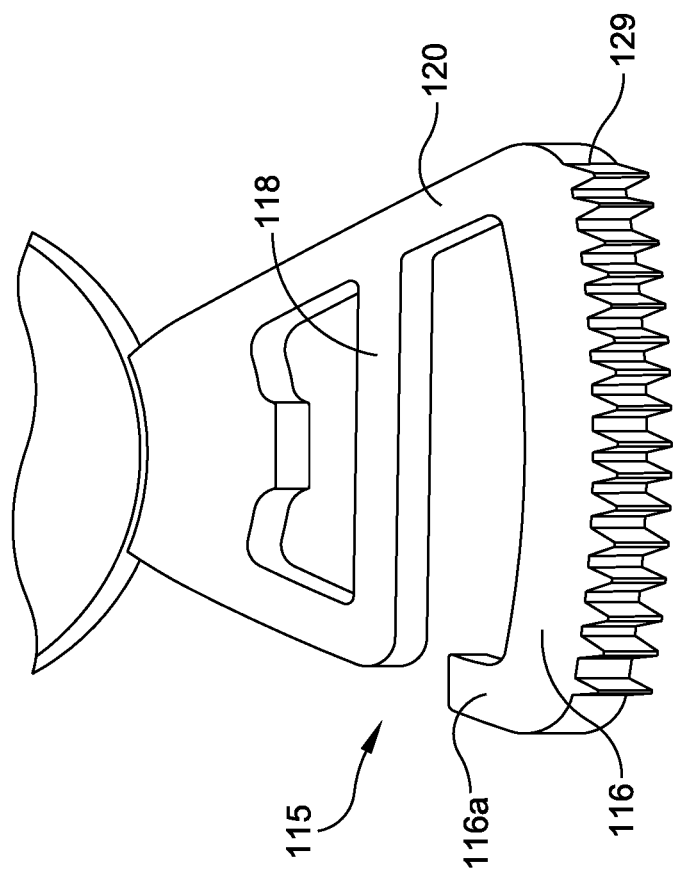
FIG. 4 shows another view of the cleaning member of FIG. 3.
Figure 3:
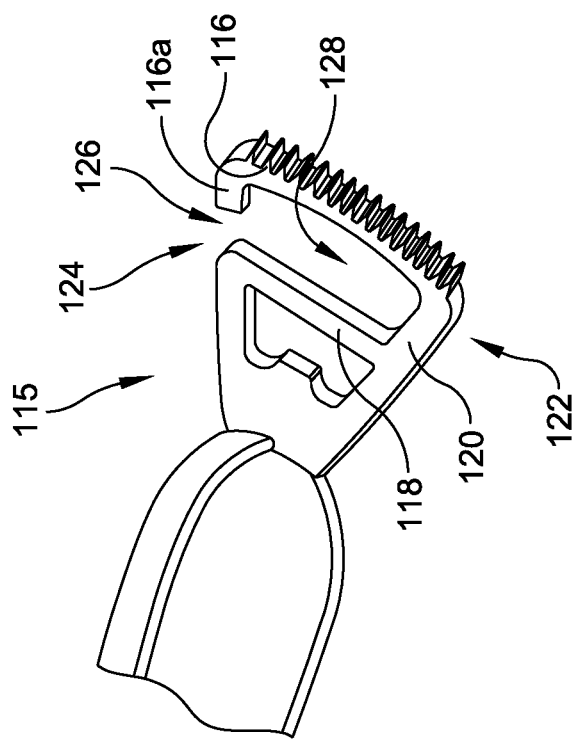
FIG. 3 shows a perspective view of a cleaning member, according to another embodiment.

FIGS. 3 and 4 show another embodiment of a cleaning member 115. The cleaning member 115 can also be included on cleaning device 100 in addition to, or in place of, cleaning members 108a-108c. Alternatively, as with all cleaning members described herein, the cleaning member 115 can be a single cleaning member at cleaning end 104. This embodiment includes a first bar 116 and a second bar 118 connected by an elongation 120 at a first side 122 of the first bar 116 and the second bar 118. The opposite, second side 124 includes an opening 126 between the first bar 116 and the second bar 118. In one embodiment, the first bar 116 includes a side cleaning extension 116a at the second side 124 configured for cleaning the side of a cross-member of the grate. Additionally, or alternatively, the second bar 118 can also include a side cleaning extension. In use, a cross-member of the grate can be introduced to a cavity 128 between the first bar 116 and the second bar 118 by guiding the cleaning member 115 such that the cross-member passes through the opening 126. With the cross-member in position within the cavity 128, the cross-member can be cleaned, as described above with respect to FIG. 2B. The elongation 120 can be used to clean one side of the cross-member and the side cleaning extension 116a can be used to clean the opposite side of the cross-member. As shown best in FIG. 4, the cleaning member 115 can include serrations 129 on the first bar 116. The serrations 129 can be used to remove food debris from the top of the grate that is difficult to remove.

In addition, in some embodiments, cavity 128 can be used to hang the cleaning device when not in use. The cleaning member 115 can also be configured to engage and turn an item (e.g., a steak) that is being cooked on a grill.

The cleaning members described above are configured to have a width dimension that is at least partially smaller than the spacing between adjacent cross-members of a cooking grate of a grill such that the cleaning member can be inserted between the adjacent cross-members. For example, in one embodiment, the width of the bars and elongation is less than 0.50 inches. In another embodiment, the width of the bars and elongation is less than 0.25 inches. Further, the first and/or second bar of the cleaning member may have a length that is greater than the space between adjacent cross-members such that when the cleaning member is rotated the bars contact the top and bottom surfaces of at least one cross-member. In some embodiments, the first and/or second bar is sufficiently long to contact multiple cross-members to allow for faster cleaning of the grate. For example, in one embodiment, the first and/or second bar is at least 1 inch long. In another embodiment, the first and/or second bar is at least 2 inches long.

Figure 5A:
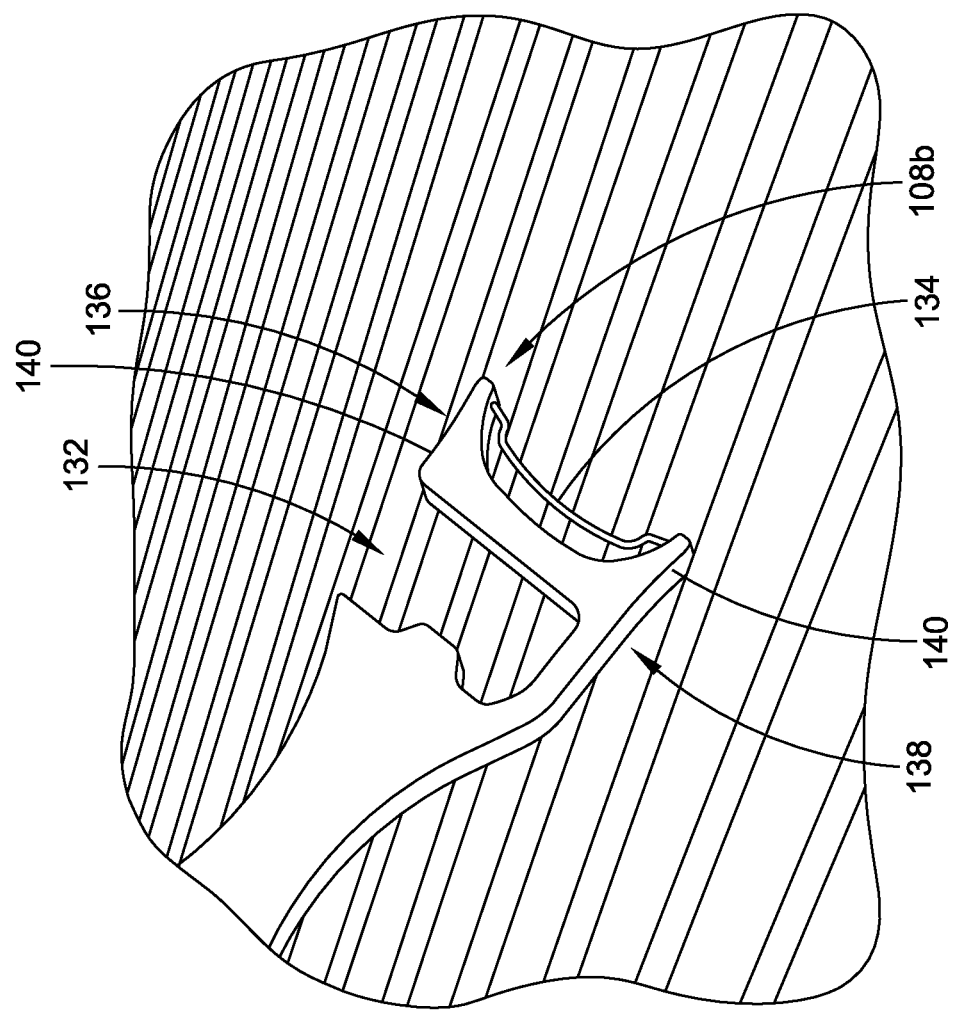
FIG. 5A shows a perspective view of the cleaning member of FIG. 5 in use.
Figure 5:
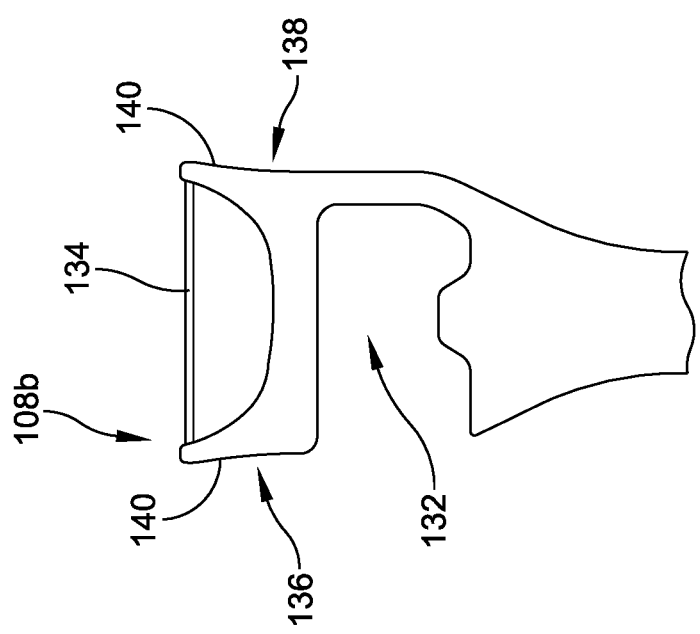
FIG. 5 shows a front view of a cleaning member, according to another embodiment.

The second cleaning member 108b is shown in detail in FIG. 5. The cleaning member 108b defines a cavity 132 within which a cross-member of a grate can be positioned to clean both the top and bottom surfaces of the cross-member, as described above with respect to the embodiments in FIGS. 3 and 4. Alternatively, the cleaning member 108b can be closed on both sides, as shown in FIG. 1. In addition, a compliant member 134 can extend from a first side 136 to a second side 138 of the cleaning member 108b The compliant member 134 is configured to clean the top and sides of a cross-member of the grate. As shown in FIG. 5A, as the compliant member 134 is pressed against the cross-member, it conforms to the shape of the cross-members to remove material from the cross-members. The compliant member 134 can be mounted to fingers 140 that extend from the cleaning member 108b and are spaced from each other such that they can be disposed on opposite sides of a single cross-member or spaced sufficiently to encompass multiple cross-members. Because the compliant member 134 is able to contour to the shape of the cross-members, it is better able to remove debris from the cross-members. In addition, fingers 140 may be configured to flex during use to allow compliant member 134 to contact additional surface area of the cross-member. In embodiments in which the fingers 140 are spaced sufficiently wide to encompass multiple cross-members, the cleaning member 134 can be rotated such that the compliant member 134 is not perpendicular to the cross-members such that the compliant member 134 is at a diagonal with each finger 140 on opposite sides of a single cross-member. This may allow the compliant member 134 to contact a larger portion of the cross-member's circumference when cleaning.

Figure 13A:
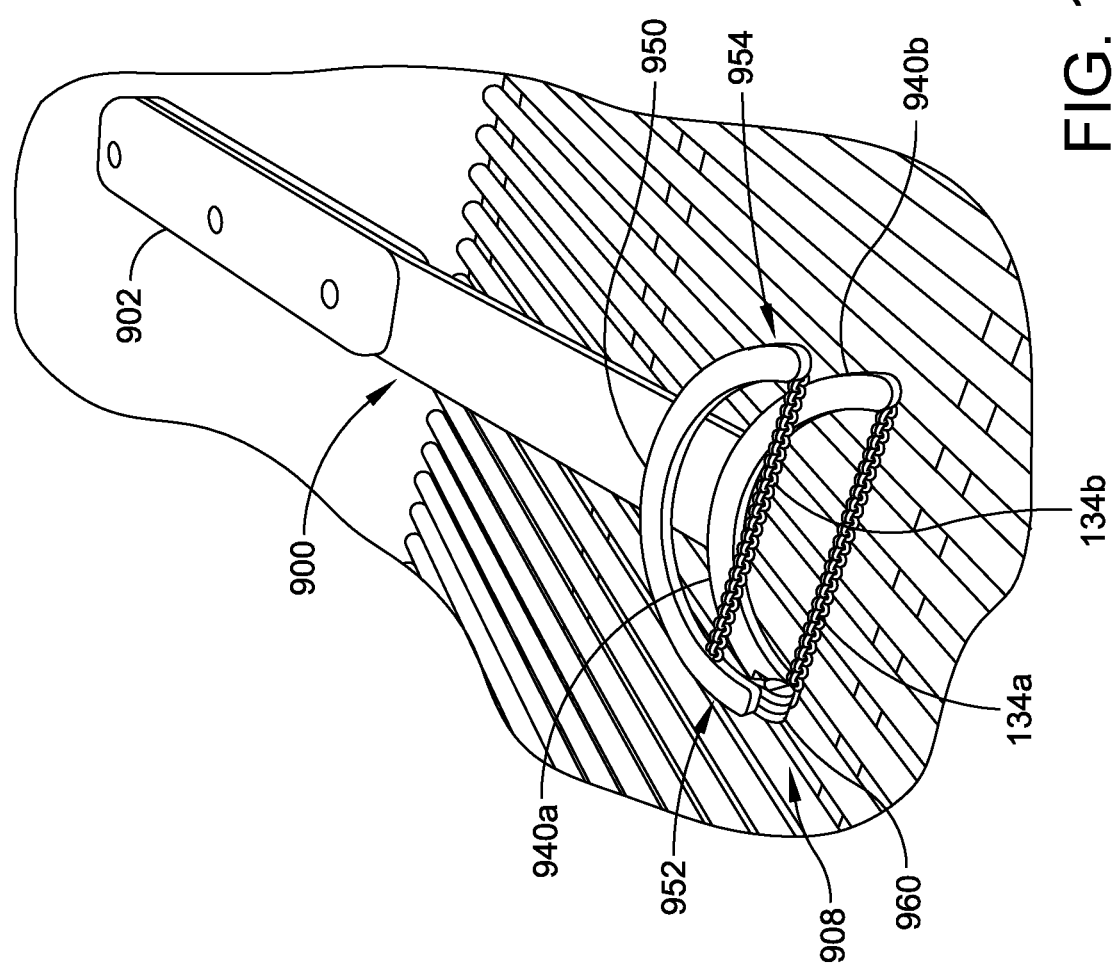
FIG. 13A shows a perspective view of a cleaning device according to another embodiment in a folded configuration.
Figure 13B:
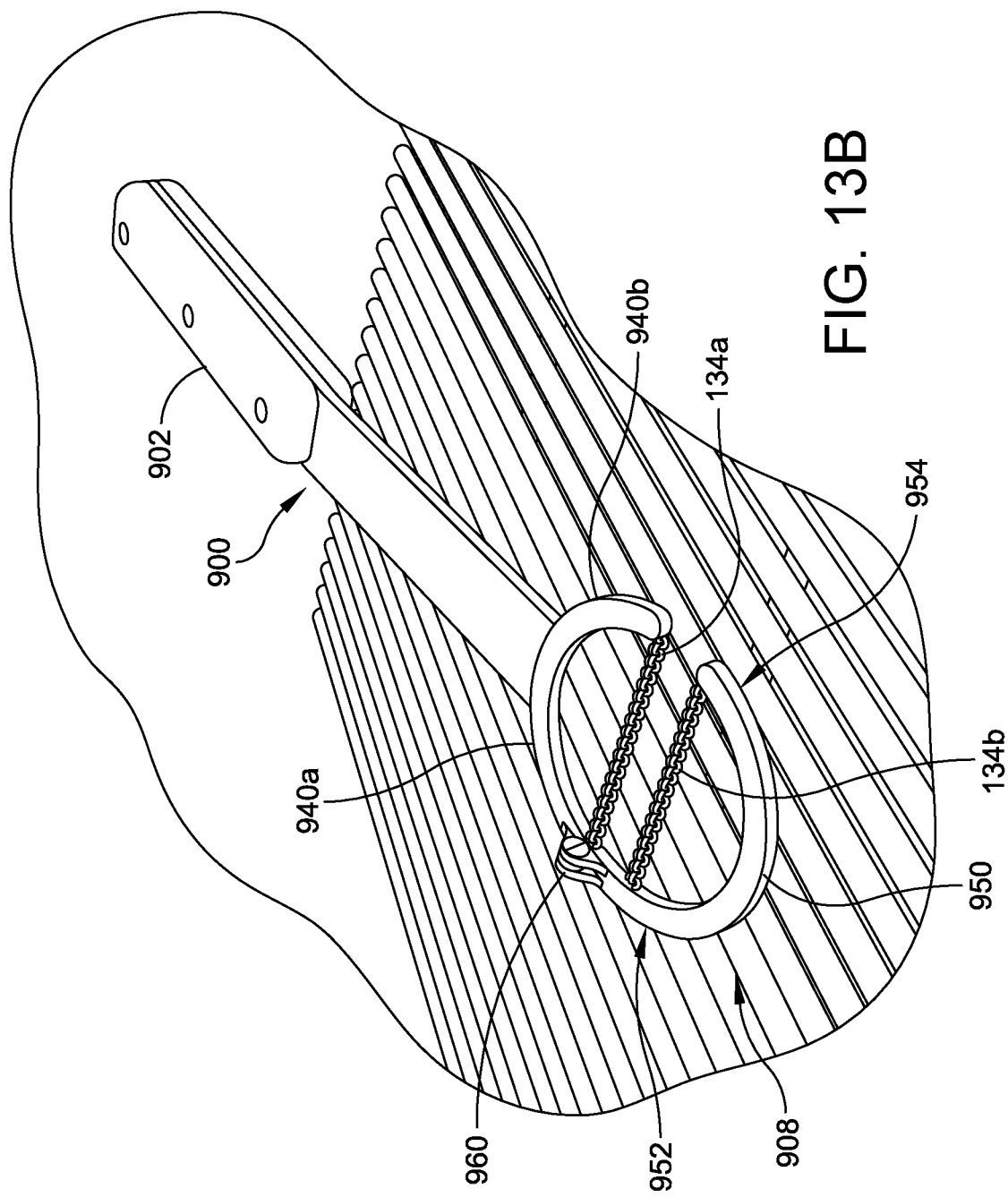
FIG. 13B shows a perspective view of the cleaning device of FIG. 13A in an extended configuration.

The compliant member 134 can be constructed of any appropriate material. For example, in one embodiment, the compliant member 134 is constructed at least partially from a metallic material such as but not limited to steel, aluminum, or stainless steel. In one embodiment, the material that the compliant member 134 is constructed from has an ultimate tensile strength of at least 10,000 pounds per square inch (psi). In another embodiment, the material that the compliant member 134 is constructed from has an ultimate tensile strength of at least 40,000 psi. In one embodiment, the compliant member 134 is a single strand of material. In other embodiments, the compliant member 134 is formed from a braid of multiple strands of material. In still other embodiments, the compliant member 134 is formed from a series of interconnected members, such as a series of chain links (e.g., as shown in FIGS. 13A-13C).

The compliant member can be attached to the cleaning member 108b through any appropriate means. For example, the fingers 140 can have holes through which the compliant member 134 can be inserted. After inserting the compliant member 134 through the holes, grommets can be installed on the ends of the compliant member 134 to prevent inadvertent removal from the cleaning member 108b. In one embodiment, the grommets are removable to allow replacement of the compliant member 134 if damaged or worn.

In various embodiments, substantial force can be applied to a cooking grate using cleaning member 108b without breaking or damaging compliant member 134, or the connection of compliant member 134 to cleaning member 108b As a result, sufficient force can be applied to the cooking grate to remove material therefrom. For example, in one embodiment, cleaning member 108b can apply at least 5 pounds of force to the cooking grate without damaging compliant member 134, or the connection of compliant member 134 to cleaning member 108b. In another embodiment, cleaning member 108b can apply at least 10 pounds of force to the cooking grate without damaging compliant member 134, or the connection of compliant member 134 to cleaning member 108b.

The strength of the compliant member 134, and the strength of its connection to the respective cleaning member, described with reference to the embodiment shown in FIGS. 5 and 5A may also be true of the embodiments shown in FIGS. 6, 7, and 13A-13C, and described below.

Figure 7:
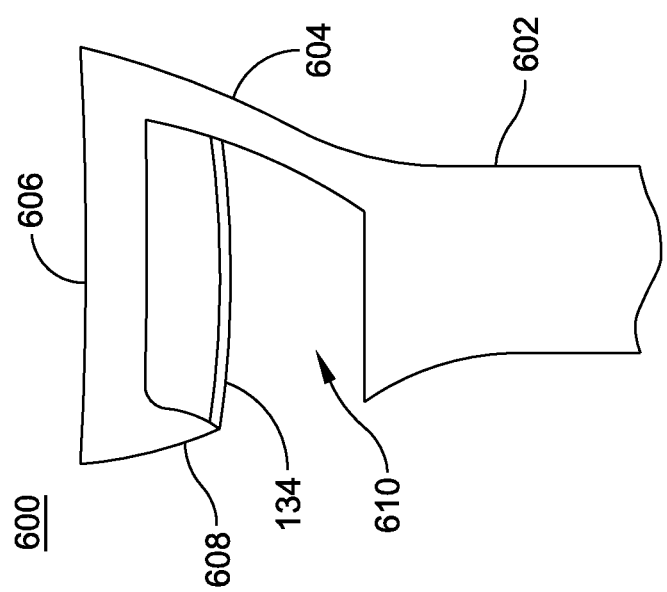
FIG. 7 shows a front view of a cleaning member, according to another embodiment.

Turning to FIG. 7, in one embodiment, the compliant member is configured to contact and clean the bottom of the cross-members. In such an embodiment, a cleaning member 600 includes a body 602, a first finger 604, a cross-bar 606, a second finger 608, and a compliant member 134. The first finger 604 extends from the body 602 to the cross-bar 606. The second finger 608 extends from the cross-bar 606 toward the body 602 such that a cavity 610 is defined between the body 602 and the cross-bar 606. In use, the cleaning member 600 is positioned such that a cross-member is within the cavity 610 with the compliant member 134 in contact with the bottom of the cross-member. With the compliant member 134 in contact with the cross-member, the cleaning member can be run along the cross-member so that compliant member 134 scrapes and cleans the cross-member.

In another embodiment, shown in FIGS. 13A-13C, a cleaning device 900 includes a handle 902 and a cleaning member 908 extending therefrom. The cleaning member 908 includes fingers 940a, 940b with a first compliant member 134a extending therebetween. In addition, an arm 950 is coupled to the first finger 940a. The arm 950 extends from a first end 952 to a second end 954 with a second compliant member 134b extending therebetween. The arm 950 can have any appropriate geometry. In one embodiment, the arm 950 is semicircular. In some embodiments, the fingers 940 are also semi-circular.

In some embodiments, as shown in FIGS. 13A-13C, the arm 950 is hingedly coupled to the first finger 940a. As shown in the transition from FIG. 13A to FIG. 13B, the arm is configured to be in either a folded configuration (FIG. 13A) or an extended position (FIG. 13B). As a result, the cleaning device 900 can be used in a variety of ways. As shown in FIG. 13A, when the arm 950 is in the folded configuration, the first compliant member 134a coupled between fingers 940 can be brought into contact with the top of one or more cross-members of a cooking grate. Alternatively, with the arm 950 extended, the arm 950 can be inserted between adjacent cross-members of the cooking grate and then the cleaning member 908 can be rotated about the longitudinal axis of the handle 902 so that the second compliant member 134b extending between the first 952 and second 954 ends of the arm 950 is in contact with the bottom of one or more cross-members, as shown in FIG. 13C. Further, the first compliant member 134a extending between the fingers 940 can be brought into contact with the top of the cross-members. When force is applied during cleaning, the compliant members 134 conform to the cross members such that a substantial portion of the surface area of the cross-members is contacted.

The arm 950 can be coupled to the first finger 940a by a hinge 960. The hinge 960 may include a mechanism for locking the arm 950 in the extended and/or folded position. For example, in one embodiment, the hinge 960 includes a thumb screw and tightening the thumb screw locks the arm 950 in position.

Figure 6:
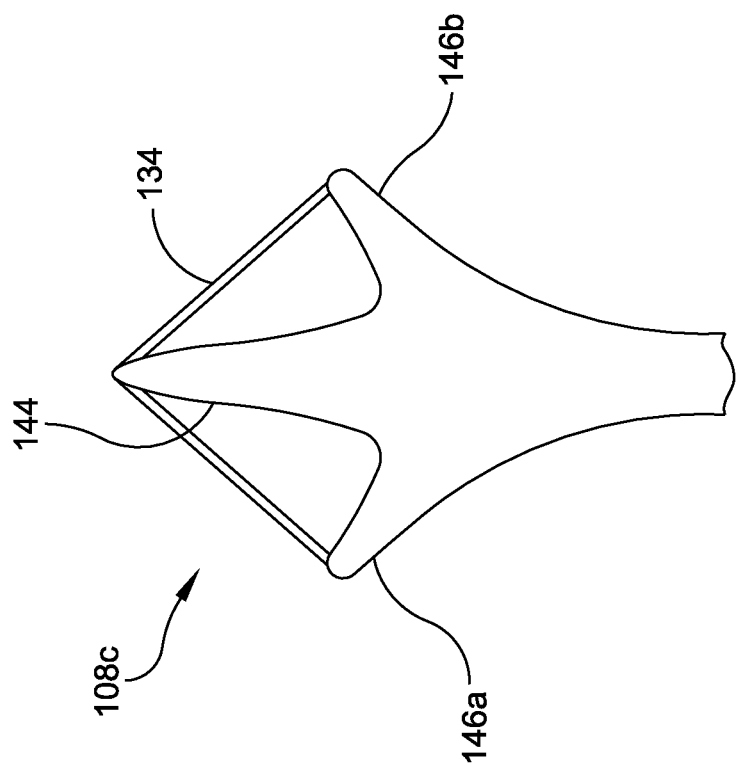
FIG. 6 shows a front view of a cleaning member, according to another embodiment.

FIG. 6 shows the third cleaning member 108c in detail. In this embodiment, the cleaning member 108c includes a central finger 144 and side fingers 146. The side fingers 146 extend from the central finger 144 at an acute angle. The compliant member 134 extends from the central finger 144 to the side fingers 146. In one embodiment, a single compliant member 134 extends from the first side finger 146a to the central finger 144 and on to the second side finger 146b. In another embodiment, a first compliant member 134 extends from the first side finger 146a to the central finger 144 and a second compliant member 134 extends from the second side finger 146b to the central finger 144. In use, the central finger 144 is inserted between adjacent cross-members of the grate. Each of the side fingers 146 is disposed on the opposite side of a respective cross-member. As a result, the compliant member 134 is in contact with the cross-members and the cleaning member 108c can be traversed along the cross-member to remove debris therefrom.

The compliant member 134 can be attached to the cleaning member 108c through any appropriate means. For example, the central finger 144 and side fingers 146 can have holes through which the compliant member 134 can be inserted. After inserting the compliant member 134 through the holes, grommets can be installed on the ends of the compliant member 134 to prevent inadvertent removal from the cleaning member 108c. In one embodiment, the grommets are removable to allow replacement of the compliant member 134 if damaged or worn.

In one embodiment, the compliant member 134 is fixedly attached to the side fingers 146 such that the compliant member 134 is not able to slide or translate with respect to the side fingers 146. At the same time, the compliant member 134 is mounted to the central finger 144 such that the compliant member 134 can slide or translate with respect to the central finger 144. For example, the compliant member 134 can pass through a hole in the central finger 144. As a result, the compliant member 134 can translate toward one side of the central finger 144 to provide additional length and wrap further around a particular cross-member of the grate.

Additionally, or alternatively, one or more of the central finger 144 and side fingers 146 can be relatively flexible to allow the fingers to flex and increase the contact of the compliant member 134 with the cross-member of the grate. For example, the central finger 144 can flex in order to wrap around a cross-member positioned between the central finger 144 and the first side finger 146a This increases the contact of the compliant member 134 with the cross-member and enhances cleaning.

In some embodiments, two or more of the cleaning members described herein are configured such that both of the cleaning members can contact and clean a grate at the same time. For example, the cleaning member 108a, shown in FIGS. 2A and 2B, and the cleaning member 108c, shown in FIG. 6, can be combined into a single cleaning unit. For example, the cleaning member 108c can be stacked on top of cleaning member 108a such that the compliant member 134 and the first and second bars 112, 114 simultaneously contact one or more cross-members of the grate. This can further enhance cleaning of the grate by providing multiple contact points with the cross-member.

Figure 10:
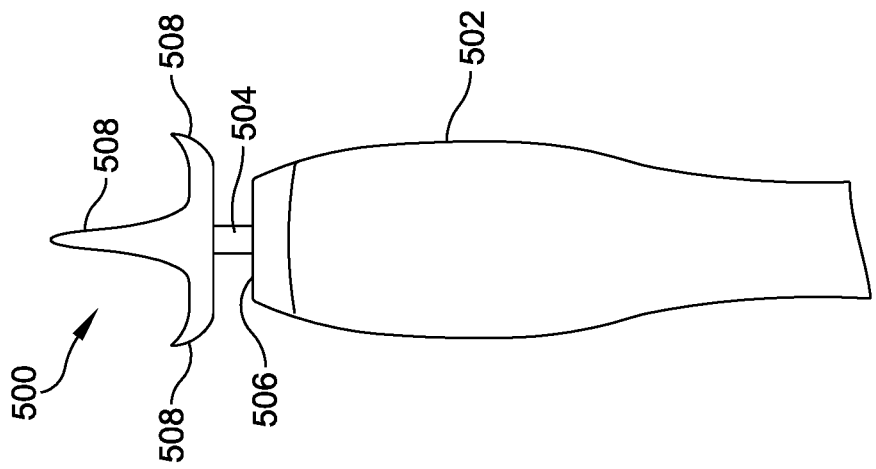
FIG. 10 shows a perspective view of the cleaning device of FIG. 9.
Figure 9:
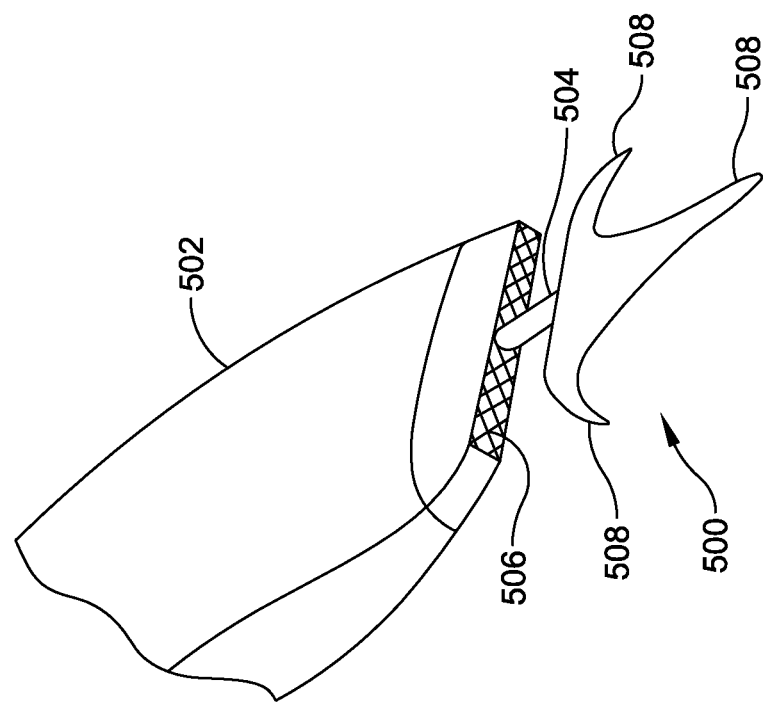
FIG. 9 shows a perspective view of a cleaning device, according to another embodiment.

In one embodiment, shown in FIGS. 9-11, a cleaning member 500 is attached directly to a handle 502 via an elongation 504. In such an embodiment, the end 506 of the handle 502 can be used as a cleaning bar similar to the cleaning member 108a shown in FIGS. 2A and 2B and described above. As such, the end 506 of the handle 502 can be constructed of steel or other relatively hard and resilient material. In addition, as shown in FIG. 9, the end 506 can have a textured or knurled surface to enhance the removal of dirt and food particles from the grate.

In use, as shown in FIG. 11, the elongation 504 is positioned between adjacent cross-members of the grill. The end 506 of the handle 502 is brought into contact with the tops of the cross-members and the fingers 508 of the cleaning member 500 are brought into contact with the bottoms of the cross-members. As the handle 502 is run back and forth across the cross-members, material is removed therefrom. This configuration of the cleaning member 500 and handle 502 allows the user to grasp the handle 502 adjacent to the top of the grate. This allows the user to apply a significant amount of force while accurately controlling the motion of the handle 502.

In one embodiment, the cleaning member 500 also includes a compliant member extending between the fingers of the cleaning member, as described above. In such an embodiment, the cleaning member can, optionally, be used similarly to the cleaning member 108*c* shown in FIG. 6 and described above.

The cleaning member 500 can be positioned at the end of any of the handles described herein. For example, in one embodiment, the cleaning member 500 is attached to the handle 102, shown in FIG. 1, at the end opposite the cleaning end 104. In embodiments having more than one cleaning member, the user can determine the cleaning member that is most appropriate to clean the desired surface, thereby providing a versatile cleaning tool.

Figure 14:
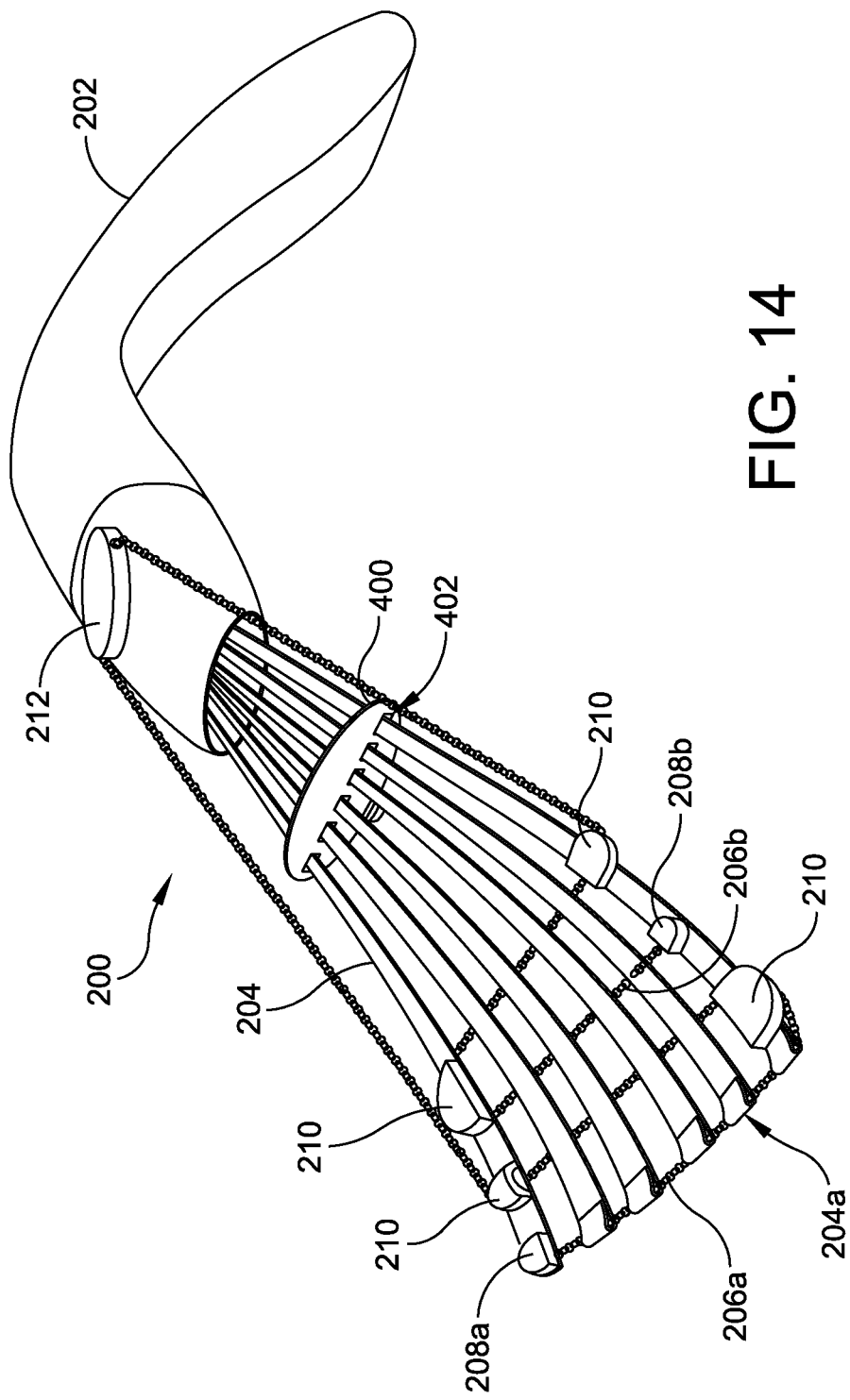
FIG. 14 shows a perspective view of a cleaning device, according to another embodiment.

In another embodiment, shown in FIG. 14, a cleaning device 200 includes a handle 202 and a plurality of fingers 204. The plurality of fingers 204 are connected at their first end to the handle 202. The fingers 204 are spaced from one another such that they can fit between adjacent cross-members of the grate. A compliant member 206 is stretched across the second end of the fingers 204. The compliant member 206 can be constructed of any appropriate material. For example, in one embodiment, the compliant member 206 is constructed at least partially from a metallic material such as but not limited to steel, aluminum, or stainless steel. In one embodiment, the material that compliant member 206 is constructed from has an ultimate tensile strength of at least 10,000 pounds per square inch (psi). In another embodiment, the material that compliant member 206 is constructed from has an ultimate tensile strength of at least 40,000 psi. In one embodiment, the compliant member 206 is a single strand of material. In other embodiments, the compliant member 206 is formed from a braid of multiple strands of material. In still other embodiments, the compliant member 206 is formed from a series of interconnected members, such as a series of chain links. In some embodiments, the compliant member 206 includes multiple strands of chain links connected together. Further, the multiple strands of chain links may wrap around one another or criss-cross to provide increased abrasiveness.

In various embodiments, substantial force can be applied to a cooking grate using cleaning device 200 without breaking or damaging compliant member 206, or the connection of compliant member 206 to cleaning device 200. As a result, sufficient force can be applied to the cooking grate to remove material therefrom. For example, in one embodiment, cleaning device 200 can apply at least 5 pounds of force to the cooking grate without damaging compliant member 206, or the connection of compliant member 206 to cleaning device 200. In another embodiment, cleaning device 200 can apply at least 10 pounds of force to the cooking grate without damaging compliant member 206, or the connection of compliant member 206 to cleaning device 200.

The strength of the compliant member 206, and the strength of its connection to the respective cleaning device, described with reference to the embodiment shown in FIG. 14 may also be true of the embodiments shown in FIGS. 15-17, and described below.

By providing a plurality of fingers 204, multiple cross-members can be cleaned simultaneously. The fingers 204 are spaced such that adjacent fingers can be inserted through the grate on opposite sides of a given cross-member. As a result, the compliant member 206 is brought into contact with the top and sides of the cross-member to allow the cross-member to be cleaned by running the compliant member 206 along the cross-member.

In one embodiment, the cleaning device 200 includes more than one length of compliant member 206. For example, as shown in FIG. 14, the cleaning device 200 can include a first compliant member 206*a* and a second compliant member 206*b*. The lengths of compliant member can be spaced along the fingers 204. In use, each of the lengths of the compliant member 206 can be brought into contact with the cross-members to further improve the cleaning of the grate. The fingers 204 may flex during use to facilitate the contact of the lengths of compliant member 206 with the grate. In addition, the fingers 204 may be upturned near their ends to allow for easier engagement of the compliant member 206 with the cross-members. In addition, this may also allow the fingers 204 to more easily ride over bars of the cooking grate running perpendicular to the cross-members being cleaned.

In one embodiment, the compliant members 206*a*, 206*b* are constructed from the same material. In another embodiment, the compliant members 206*a*. 206*b* are constructed from different materials. The cleaning device 200 can include any number of lengths of compliant member 206.

In one embodiment, as shown in FIG. 14, the lengths of compliant member 206 are substantially perpendicular to the fingers 204. In another embodiment, the lengths of compliant member 206 form an acute angle with the fingers 204.

In one embodiment, the ends 204*a* of at least some of the fingers 204 are bent back along the fingers 204 to create a pass-through that can accommodate the compliant member 206, thereby retaining the compliant member 206 at the end of the fingers 204. The compliant member 206 can be slidingly engaged with each of the fingers 204 such that the compliant member 206. In other embodiments, the compliant member 206 is fixed to each finger 204 such that a discrete length of compliant member 206 extends between each adjacent finger 204 such that that discrete length conforms to the cross-member positioned between the respective fingers. For example, in some embodiments, compliant member 206 is welded to each finger 204.

The cleaning device 200 also includes a clasp 208 to engage and retain the end of the compliant member 206. In at least one embodiment, the cleaning device includes two clasps 208*a*, 208*b* to retain the two compliant members 206*a*. 206*b*, respectively. For example, as shown in FIG. 14, a first clasp 208*a* can be disposed at the end of a finger 204. The first clasp 208*a* engages and retains the first compliant member 206*a*. The second clasp 208*b* is engaged with another finger 204 and is spaced away from the end of the finger 204. The second clasp 208*b* retains an end of the second compliant member 206. The ends of the compliant members 206 can be engaged with the clasps 208 in any appropriate manner. For example, the compliant member 206 can be bonded, pressed, or otherwise fastened to the clasps 208. The cleaning device 200 can include any number of clasps 208 to correspond to the number of compliant members 206.

The cleaning device 200 also includes one or more guides 210 to direct the compliant members 206 along the desired orientation. For example, the guides 210 can include grooves within which the compliant member 206 can be disposed and slidably retained. In other embodiments, the compliant member 206 is fixed to each guide 210. For example, in some embodiments, the compliant member 206 is welded to each guide 210. In one embodiment, the guides 210 allow each of the compliant members 206 to extend from one side of the cleaning device 200 to the opposite side more than once (i.e., make multiple passes), as shown in FIG. 14. After extending across the fingers 204 as desired, the compliant member 206 is turned by a guide 210 to allow the compliant member 206 to be connected to a connector 212 of the handle 202. As will be described in further detail below, the connector 212 can be configured to allow the tension of the compliant member 206 to be adjusted.

Figure 15:
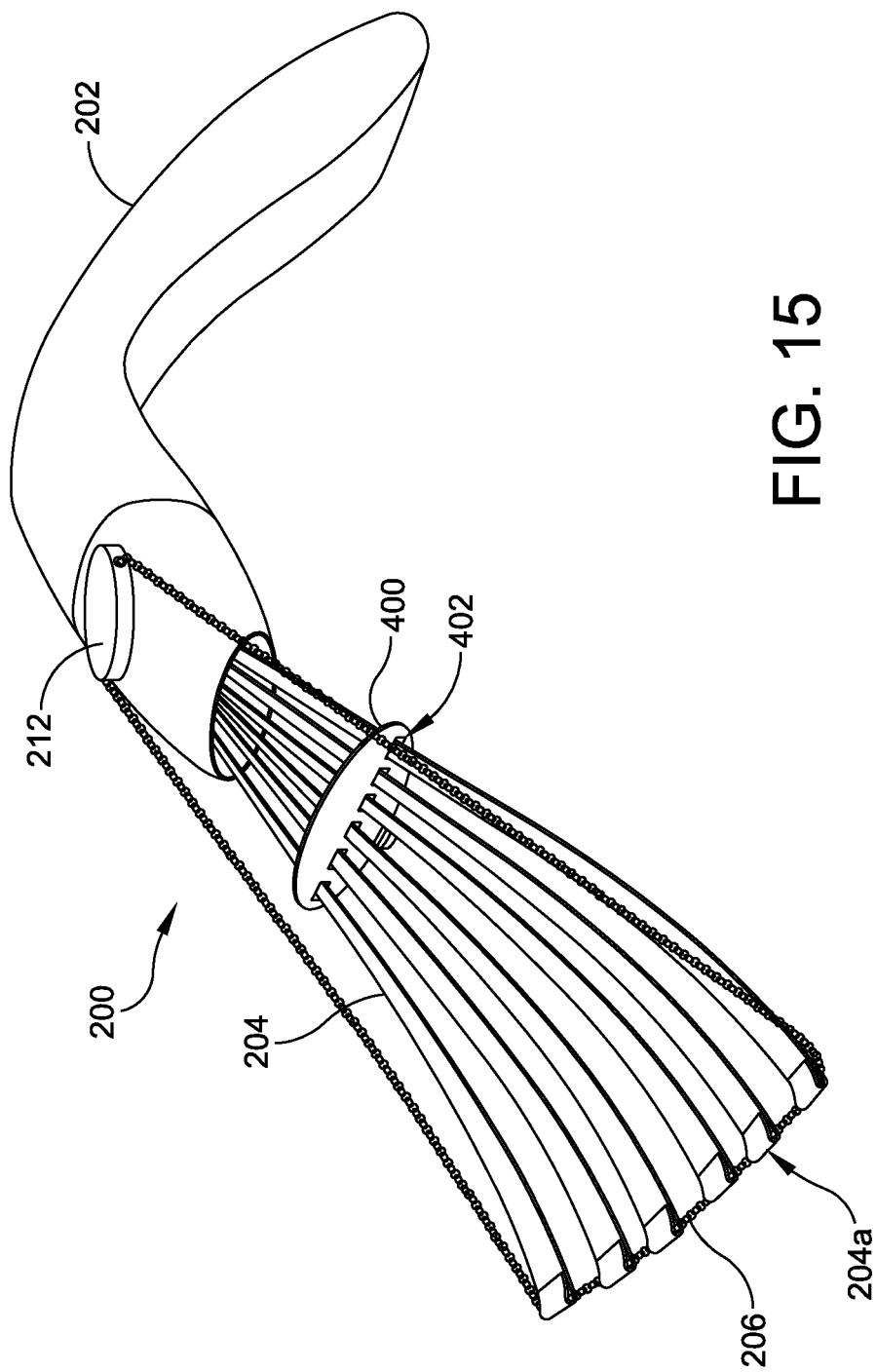
FIG. 15 shows a perspective view of a cleaning device, according to another embodiment.

In another embodiment, shown in FIG. 15, the compliant member 206 is connected to connector 212 and engaged with each of the fingers 204. As shown, in this embodiment, the compliant member 206 extends only once across the fingers 204. In the illustrated embodiment, the compliant member 206 is engaged with the ends 204a of the fingers 204. In one embodiment, the compliant member 206 is slidably engaged with the ends 204a. In other embodiments, the compliant member 206 is fixed to ends 204a (e.g., by welding). In other embodiments, guides (e.g., guides 210 shown in FIG. 14) are coupled to one or more of the fingers 204 and engage the compliant member 206, either slidably or fixed.

Figure 16:
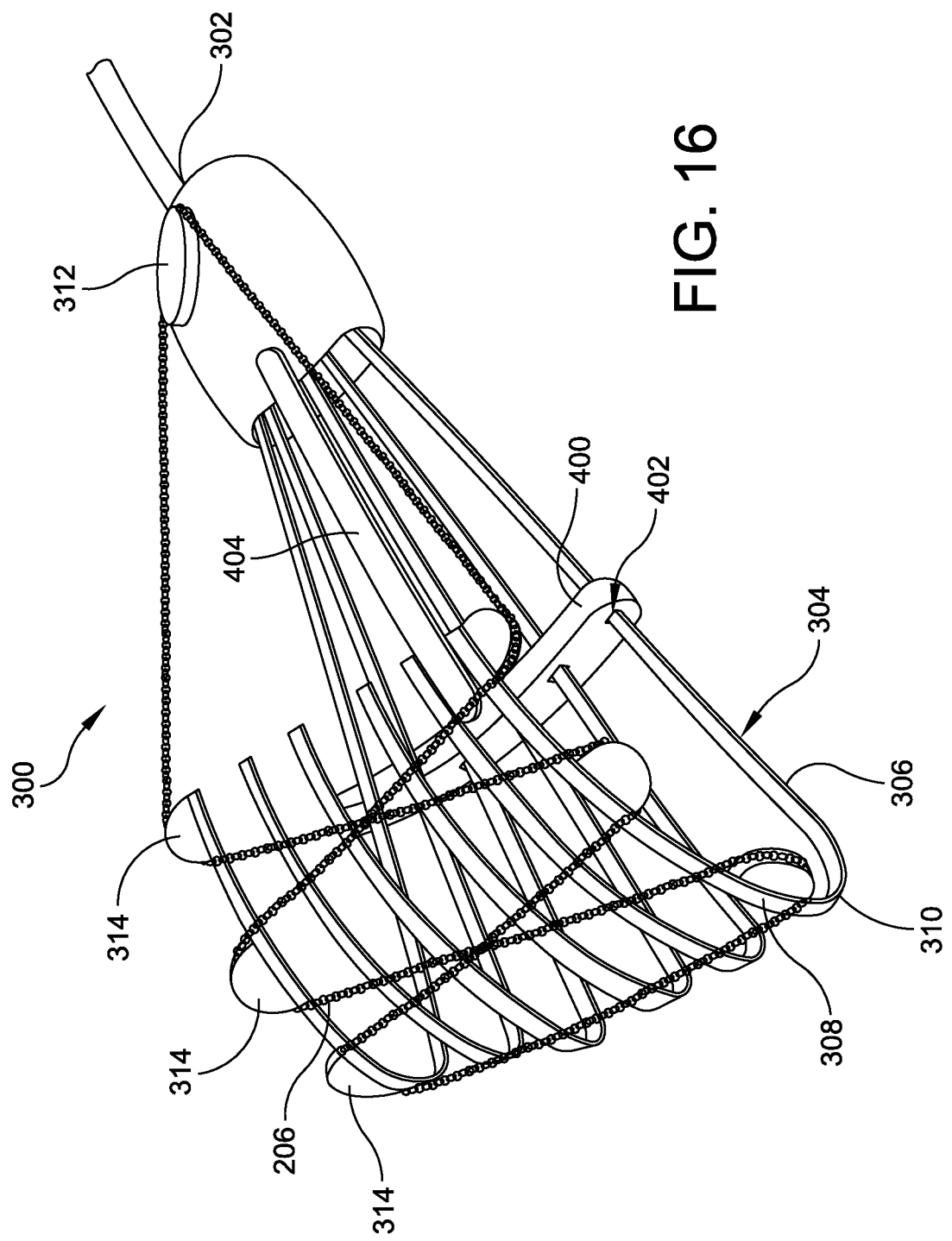
FIG. 16 shows a bottom perspective view of a cleaning device, according to another embodiment.

In another embodiment, shown in FIG. 16, a cleaning device 300 has fingers 304 that have a first portion 306 and a second portion 308 separated by a curve 310. The compliant member 206 can be engaged with the second portion 308 of the fingers 304 and also connect to the handle 302 at connector 312. Providing the compliant member 206 on the second portion 308 may allow the grate to be cleaned while holding the cleaning device in a more ergonomic position and/or may allow for more force to be applied to the grate. As described above, the fingers 304 may be flexible to allow them to deform and provide contact between the multiple stages of the compliant member 206 and the grate.

As shown in FIG. 16, the cleaning device can include a single compliant member 306. The compliant member 306 is retained by a plurality of guides 314 connected to the fingers 304. A first end of the compliant member 206 connects to a first side of the connector 312 and a second end of the compliant member 206 connects to a second side of the connector 312. As shown, the compliant member 306 crisscrosses as a result of the configuration of the guides 314.

Figure 17:
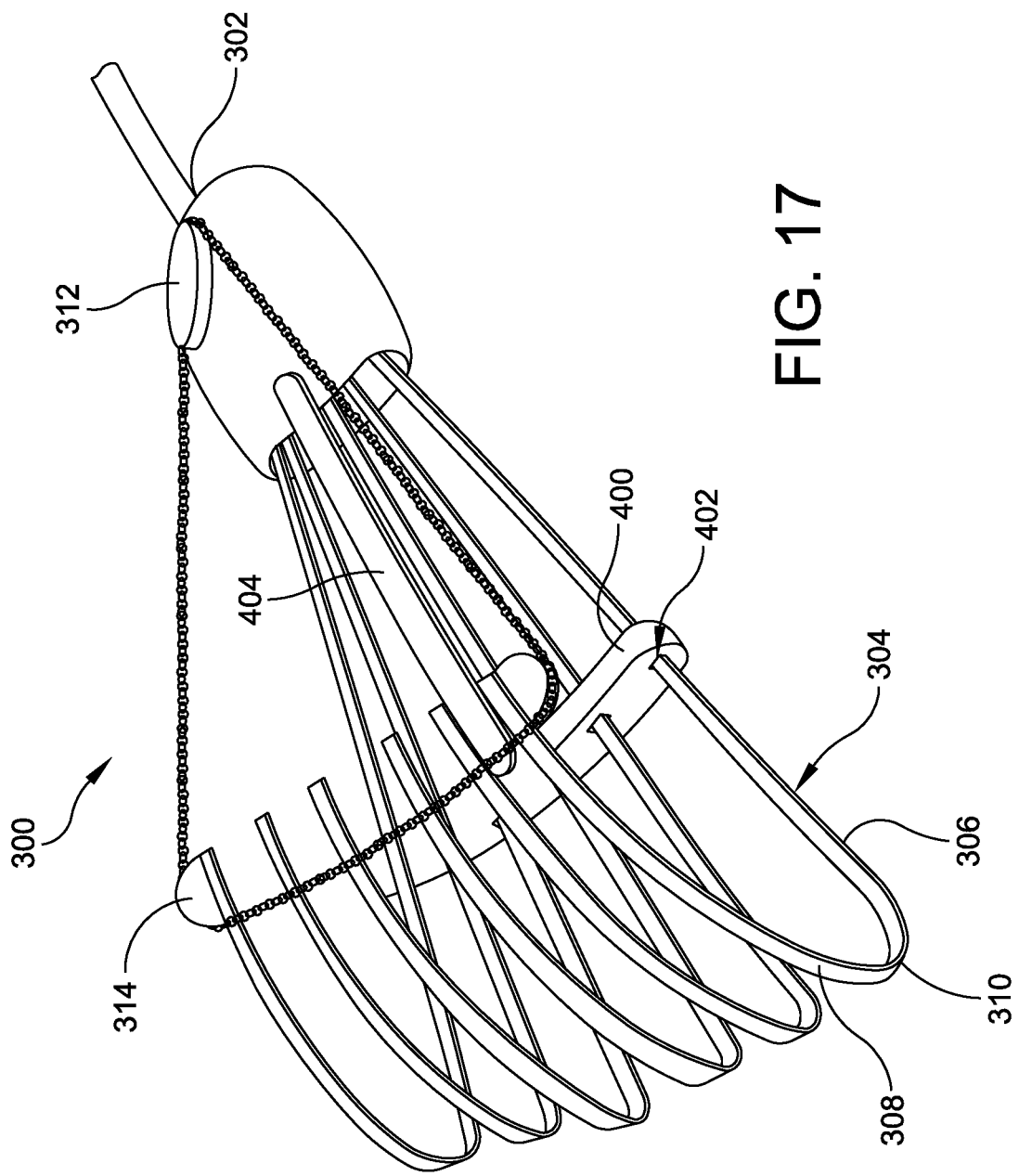
FIG. 17 shows a bottom perspective view of a cleaning device, according to another embodiment.

In another embodiment, as shown in FIG. 17, the compliant member 206 makes only a single pass across the fingers 304. In one such embodiment, as shown in FIG. 17, the compliant member 206 is slidably engaged with guides 314 that are coupled to the outboard fingers 304. In other embodiments, the compliant member 206 is fixed to the guides 314. Alternatively, or additionally, the compliant member 206 can be coupled to the ends of the fingers, as shown in FIG. 15.

In embodiments such as those shown in FIGS. 14-17, the space between the fingers 204, 304 can be adjustable to accommodate different spacing between cross-members of the grate. For example, in one embodiment, rotation of the connector 212, 312 adjusts the tension in the compliant member. Rotation of the connector 212, 312 in a first direction causes the tension in the compliant member 206 to increase, thereby pulling the fingers 204, 304 closer together and reducing the space between adjacent fingers 204, 304. Conversely, rotation of the connector in an opposite, second direction causes tension in the compliant members to decrease, thereby allowing the fingers 204, 304 to spread further apart and increasing the space between adjacent fingers 204, 304.

In one embodiment, the cleaning device includes a ratchet mechanism that retains the connector 212, 312 at a desired position. In such an embodiment, rotation of the connector 212, 312 increases the tension on the compliant member 206. The ratchet mechanism retains the connector 212, 312 in this position until the operator desires to release the tension on the compliant member 206. The tension can be released in any appropriate manner. For example, the connector 212, 312 can be pulled up, away from the handle, to release the ratchet and allow the connector 212, 312 to rotate in the opposite direction.

Furthermore, as shown in FIGS. 14-17, the cleaning device can include a stabilizer bar 400 engaged with the fingers 204, 304 and spaced from the handle 202, 302. The stabilizer bar 400 can include apertures 402 within which the fingers 204, 304 are disposed. The stabilizer bar 400 aids in maintaining the spacing of the fingers 204, 304 and controls the flexing of the fingers 204, 304. In one embodiment, the apertures 402 are slots such that the fingers 204, 304 are able to translate within when the spacing between the fingers 204, 304 is changed, as described above.

In one embodiment, as shown best in FIG. 16, the cleaning device 200, 300 further includes a rod 404 connected between the handle 202, 302 and the stabilizer bar 400. The rod 404 can be relatively rigid to limit the movement of the stabilizer bar 400 with respect to the handle 202, 302.

In various embodiments, the stabilizer bar 400 is configured to adjust the spacing between adjacent fingers 204, 304. For example, the position of the stabilizer bar 400 along the fingers 204, 304 can determine the spacing of the fingers 204, 304. For example, in one embodiment, moving the stabilizer bar 400 further from the handle 202, 302 causes adjacent fingers 204, 304 to move closer together. In one embodiment, the stabilizer bar 400 can be translated manually by the user. In other embodiments, the position of the stabilizer bar 400 is adjusted by translation of rod 404 by, for example, operation of a drive screw mechanism. In such an embodiment, the cleaning device may include a knob coupled to the handle and threadably engaged with the rod 404. Rotation of the knob may, thereby, cause translation of the rod 404 and stabilizer 400 to adjust the spacing of the fingers 204, 304.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

I claim:

1. A cleaning device, comprising:
   a handle; and
   a first cleaning member coupled to the handle, the first cleaning member including:
      a first finger including a first end;
      a second finger spaced apart from the first finger and including a second end; and
      a first compliant member extending directly from the first end of the first finger to the second end of the second finger, the first compliant member being constructed at least partially from a metallic material; wherein
   the first finger and the second finger are shafts extending from the handle,
   the first finger is spaced from the second finger to accommodate a cross-member of a grate between the first finger and the second finger such that the first compliant member is configured to contact the cross-member, and
   the first compliant member is a flexible strand configured to conform to a shape of the cross-member when the first compliant member is pressed against the cross-member to remove material from the cross-member.

2. The cleaning device of claim 1, wherein the first compliant member includes a plurality of chain links coupled together.

3. The cleaning device of claim 1, wherein the first finger extends between a body of the first cleaning member and a cross-bar of the first cleaning member, and wherein the second finger extends from the cross-bar toward the body such that the first cleaning member is configured to receive the cross-member of the grate between the cross-bar and the body with the first compliant member in contact with a bottom of the cross-member.

4. The cleaning device of claim 1, wherein the first cleaning member further includes:
   an arm coupled to the first finger, the arm extending from a first end to a second end; and
   a second compliant member coupled to the first end and the second end of the arm;
   wherein, in use, the first compliant member is configured to contact a top of the cross-member of the grate and the second compliant member is configured to contact a bottom of the cross-member of the grate.

5. The cleaning device of claim 4, wherein the arm is hingedly coupled to the first finger.

6. The cleaning device of claim 1, further comprising a second cleaning member coupled to the handle.

7. The cleaning device of claim 6, wherein the first cleaning member and the second cleaning member are rotatably coupled to the handle.

8. The cleaning device of claim 6, wherein the second cleaning member includes:
   an elongation and a first bar and a second bar extending transverse to the elongation, the second bar spaced from the first bar along the elongation;
   wherein the second cleaning member is configured to be inserted between adjacent cross-members of the grate and, after insertion, rotated such that the first bar contacts a bottom of at least one of the adjacent cross members and the second bar contacts a top of the at least one of the adjacent cross-members.

9. The cleaning device of claim 6, further comprising a third cleaning member, wherein the third cleaning member comprises:
   a first side finger;
   a second side finger;
   a central finger between the first side finger and the second side finger; and
   a third compliant member attached to the first side finger, the central finger, and the second side finger;
   wherein the first side finger is spaced from the central finger to accommodate a first cross-member of the grate between the first side finger and the central finger; and
   wherein the second side finger is spaced from the central finger to accommodate a second cross-member of the grate between the second side finger and the central finger.

10. The cleaning device of claim 9, wherein the first cleaning member, the second cleaning member, and the third cleaning member are rotatably coupled to the handle.

11. The cleaning device of claim 1, wherein the first finger and the second finger are configured to flex during use.

12. A cleaning device, comprising:
   a handle;
   a first cleaning member coupled to the handle, the first cleaning member including:
      a first finger;
      a second finger spaced apart from the first finger; and
      a first compliant member extending from the first finger to the second finger, the first compliant member being constructed at least partially from a metallic material; and
   a second cleaning member coupled to the handle, wherein
   the first finger is spaced from the second finger to accommodate a cross-member of a grate between the first finger and the second finger such that the first compliant member is configured to contact the cross-member,
   the second cleaning member includes an elongation and a first bar and a second bar extending transverse to the elongation, the second bar spaced from the first bar along the elongation, and
   the second cleaning member is configured to be inserted between adjacent cross-members of the grate and, after insertion, rotated such that the first bar contacts a bottom of at least one of the adjacent cross members and the second bar contacts a top of the at least one of the adjacent cross-members.

13. The cleaning device of claim 12, further comprising a third cleaning member, wherein the third cleaning member includes:
   a first side finger;
   a second side finger;
   a central finger between the first side finger and the second side finger; and
   a third compliant member attached to the first side finger, the central finger, and the second side finger, wherein
   the first side finger is spaced from the central finger to accommodate a first cross-member of the grate between the first side finger and the central finger; and the second side finger is spaced from the central finger to accommodate a second cross-member of the grate between the second side finger and the central finger.

14. The cleaning device of claim 13, wherein the first cleaning member, the second cleaning member, and the third cleaning member are rotatably coupled to the handle.

* * * * *